3,258,412
IRRADIATION OF OIL SHALE-POLYOLEFIN
ARTICLES
Donald E. Carr, Bartlesville, Okla., assignor to Phillips
Petroleum Company, a corporation of Delaware
No Drawing. Filed Apr. 28, 1960, Ser. No. 25,195
13 Claims. (Cl. 204—159.2)

This invention relates to the irradiation of oil shale-polyolefin articles.

The prior art discloses many methods for molding articles using various naturally occurring materials after suitable preparation. In most of these a binder is included to bind the material during molding. Recently proposed methods for producing molded articles by the combined action of heat and pressure on oil shales containing at least about 45 gallons of oil per ton of mineral have shown some promise for utilizing the vast quantities of oil shale available. There is disclosed in U.S. Patent 3,072,593, January 9, 1963, of John W. Marx and Harry W. Parker, Serial No. 862,034, filed December 28, 1959, a method for utilizing the even more abundant oil shale deposits which assay less than 45 gallons of available oil per ton of oil shale. By this invention, finely divided solid polyolefin and finely divided oil shale are admixed and molded under conditions of heat and pressure to form articles having lasting beauty, good mechanical strength and high electrical resistivity as well as controlled characteristics of density and brittleness.

By the method of this copending invention, oil shales having a recoverable oil content of from 15 to 85 or more gallons per ton of oil shale are crushed or ground to an average particle size of from about ¼ inch to that which will pass through a 200-mesh screen. The ground oil shale is then intimately admixed with a finely divided solid polyolefin having an average particle size comparable to that of the oil shale and the mixture is then subjected to heat and pressure to produce the desired shaped article. The powdered or granulated blend is placed in a closed mold and heated to a temperature in the range of about 250 to about 400° F. while applying a pressure of about 500 to about 20,000 p.s.i., or higher, for about ½ to 10 minutes. The mold is then cooled to a temperature generally below 250° F. before the pressure is released. The molding temperature is, in every case, below the decomposition temperature of the kerogen and the polyolefin. The molding time will be that necessary to plasticize the kerogen and polyolefin and will depend upon the molding temperature and the size of the article being molded.

Oil shales containing kerogen equivalent to about 25 to about 35 gallons of oil per ton of shale are particularly desirable from the standpoint of excellence of molded article and availability of oil shale.

This invention represents an improvement over the aforementioned copending application.

One object of this invention is to produce molded articles from oil shale-polyolefin admixtures.

Another object of this invention is to improve the hardness of articles molded from an admixture of oil shale and polyolefin.

Still another object of this invention is to provide a method for improving the hardness of molded articles of oil shale-polyolefin by irradiation with high energy ionizing radiation.

Other objects and advantages will be apparent to one skilled in the art upon study of this disclosure, including the detailed description of the invention.

The objects of this invention are broadly accomplished by intimately admixing oil shale and a solid polyolefin, subjecting said mixture to a molding temperature at a molding pressure, removing said molded article from the mold, and irradiating said molded article with high energy ionizing radiation to form a product having hardness superior to the non-irradiated article.

The solid polyolefin can be combined with oil shale in all amounts; however, an amount of about 2 to about 95 weight percent of polyolefin based on the total composition is generally used and about 5 to about 95 weight percent is usually preferred where molded articles are to be produced. If it is desired to preserve the hardness contributed by the oil shale in the finished article, the polyolefin will be used in the range of about 5 to about 30 weight percent of the finished article; whereas, if a softer article is desired, about 30 to about 95 weight percent, or more, of the molding mixture will be polyolefin. Mixtures containing as little as about 2 weight percent of polyolefin are useful as heavy construction materials such as paving for roads and streets and for preformed or continuous piling for buildings or other heavy structure supports such as wharfs and docks.

Although any of the known polyolefins can be utilized in the molding powders of this invention, those polyolefins produced according to the process disclosed in the patent of Hogan and Banks, U.S. Patent 2,825,721, are preferred because of their high molecular weights and their high values of crystallinity. A satisfactory specific process comprises contacting ethylene or mixtures of ethylene with other unsaturated hydrocarbons with a suspension of chromium oxide-containing catalyst in a liquid hydrocarbon diluent, the contacting occurring at a temperature such that substantially all of the polymer produced is insoluble in the diluent and is in solid particle form, the particles being substantially non-tacky and non-agglutinative in the liquid diluent. The solid polyolefins applicable for use in the invention include polyethylene, polypropylene, polybutylene, and copolymers of ethylene and propylene and copolymers of ethylene and butylene.

Any commercial polyethylene can be utilized, although some sacrifice in surface hardness will result from use of the softer grades of polyethylene. In order to grind some of the softer polyolefins, it will usually be desirable to reduce the temperature of the polyolefin such as by grinding with Dry Ice. Obviously, other refrigeration means can be utilized to embrittle the polyolefin.

In some applications it may be desirable to add the polyethylene in flakes or shreds in order to obtain mottled effects or to take advantage of the high tensile strength of the polyethylene in either one or random directions.

When the polyethylene and the oil shale are blended together in a roll mill or a mixer, such as a Banbury mixer, it is not necessary to reduce the size of the polyethylene beyond that which results from ordinary methods of manufacture.

The abrasion resistance and hardness of these materials are superior to the materials most commonly utilized in the fabrication of articles such as floor tile including resin-, rubber-, polyethylene- or asphalt-compositions. The mechanical strength of the molded articles of this invention is as good as, or superior to, similar conventionally molded articles. The appearance (shape, color, and porosity) of the molded articles is unaffected by contact with boiling water for as long as 16 hours.

As disclosed in Marx and Parker, supra, colored pigments and agents can be incorporated into the materials during the blending operation to form products having a wide spectrum of color.

It has now been found that the Shore D hardness (as measured by the method of ASTM D676–58T) of these molded articles of oil shale and polyolefin can be improved by exposure to a source of high energy ionizing radiation sufficient to obtain a total dosage of about $10^6$ to about $10^9$ roentgens or more. It is generally preferred that the total dosage be in the range of $5 \times 10^6$ to $5 \times 10^7$ roentgens.

The improvement in hardness on the molded materials herein described is essentially independent of the dose accumulation rate of irradiation but is dependent upon the total dose. Dose accumulation rate, or intensity, may become an important consideration when a limited amount of time is available or when an increase in time results in a degraded product due to oxidation, etc., or when the intensity (roentgens/cm.$^2$/hr.) is such that there is appreciable heat built up in the article, and the like. By dose accumulation rate is meant the number of roentgen units of high energy ionizing irradiation per unit time applied to the molded article. Total dose refers to the total number of roentgen units applied. Intensity is the concentration of radiation per unit area per unit time. A roentgen unit as defined herein is the amount of radiaction that produces one electrostatic unit of charge per cubic centimeter of air under standard temperature and pressure conditions and as employed herein refers to the amount of high energy ionizing radiation measured with an air-equivalent ionization chamber having an 11 cm.$^3$ aluminum cavity filled with air with a 900 volt potential applied between the probe and the wall of the chamber and measuring the number of ions produced by a counter after amplification.

The depth of hardness improvement may be varied by varying the energy level of the irradiation.

Any suitable source of high energy ionizing irradiation having an energy level at least equivalent to X-rays, mechanical or nuclear, and preferably a source capable of introducing gamma rays, can be used to irradiate the molded article. Although neutrons, alpha particles, beta particles, gamma rays or X-rays may be used to irradiate the molded article, gamma rays are preferred because of their high energy level which permits relatively high penetration and absence of residual radiation in the molded article. The source can be, for example, any means for generating high energy ionizing radiation, such as an X-ray tube, spent fuel elements, atomic waste, radioactive isotopes and the like. Irradiation by gamma rays can be advantageously conducted by placing the molded article adjacent a spent fuel element or group of fuel elements, such as cobalt-60 and iron-59, after their withdrawal from a nuclear reactor. Irradiation can be conveniently carried out while the elements are cooling off in a canal adjacent the reactor. The fuel elements can be any suitable type which are capable of producing radiation within an intensity range which will produce the desired improvement within a reasonable period of time, preferably $10^3$ to $10^7$ roentgens per hour. In the specific runs described hereinafter in the example, the fuel elements employed were removed from the Materials Testing Reactor which is described in Nucleonics, 12, No. 4, 21–26 (April 1954). While the radiation obtained from this method are gamma rays, other sources may be used. For instance, high energy electrons as supplied by a Van de Graaff machine may be used to strike a tungsten target to form X-rays and gamma rays which will strike the molded article. It is also possible to irradiate with beta rays, such as by employing carbon 14, phosphorus 32, or strontium 90 although the time element may become an important consideration here.

It is thought that the change in Shore D hardness of the molded article is a result of the high energy input which results in a molecular cross-linking of the polyolefin molecules and the oil molecules in the presence of mineral matter. However, this invention is not limited by any theory, express or implied, attempting to explain this improvement.

In a specific embodiment of the invention, oil shale having a recoverable oil content of about 15 to 85 or more gallons per ton of oil shale is crushed or ground to an average particle size of about ¼″ to that which will pass through a 200 mesh screen. The ground oil shale is then intimately admixed with a finely divided solid polyolefin having an average particle size comparable to that of the oil shale and the admixture is then subjected to a temperature in the range of 250 to about 400° F. while applying a pressure of 500 to about 20,000 p.s.i. or higher for about ½ to 10 minutes. The mold is then cooled to a temperature generaly below 250° F. or the softening point of the polyolefin before the pressure is released. The molded article is then subjected to a dosage of $10^6$ to $10^9$ roentgens, preferably gamma rays from a source such as a cobalt-60 spent fuel element.

In view of the susceptibility of polyolefins in general to oxidative attack at elevated temperatures, it is sometimes advisable to subject the molded article to irradiation in the absence of air. More preferably, the irradiation should take place in an inert atmosphere such as helium gas.

The following specific example presents data which illustrates and clarifies the invention but should not be so interpreted as to restrict or limit the invention unnecessarily.

*Example*

A dry blend of 70 weight percent Colorado oil shale and 30 weight percent polyethylene prepared by the method of Hogan and Banks, supra, and having a density of 0.960 gm./cc. was molded into a disc having a diameter of 1¼ inches and a thickness of ⅜ inch. The materials were then ground to pass a 100 mesh screen, blended, placed in a mold, heated to 316° F., pressed at 5,000 p.s.i., held at this temperature for approximately two minutes, cooled below 248° F. and removed from the mold. The disc was then broken up, remolded, broken and again remolded to obtain a homogeneous disc having a Shore D hardness (as determined by ASTM D–676–58T) of 68 to 70. The original and secondary moldings were similarly tested for Shore D hardness to insure that the appearance and hardness of the material were unchanged, thereby assuring a truly homogeneous thermoplastic composition.

This disc was then wrapped in aluminum foil and placed in a sealed container in an atmosphere of helium. The container had been evacuated and flushed with helium prior to sealing to insure complete removal of air. The can was then lowered into a gamma ray facility at the materials testing reactor hereinbefore described and subjected to a dosage of $3 \times 10^7$ roentgens.

The Shore D hardness on the treated material averaged 71 to 73 compared to the 68 to 70 measured prior to irradiation representing a significant increase in hardness.

This hardness was also manifested in the appearance of the molded disc surface which had a mirror-like finish after irradiation contrasted with the dull, dark brown-black surface prior to irradiation.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

While certain examples, structures, compositions and process steps have been described for purposes of illustration, the invention is not limited to these. Variation and modification within the scope of the disclosure and claims can readily be effected by those skilled in the art.

What I claim is:

1. A process for making a molded article having an increased Shore D hardness, which comprises admixing finely divided oil shale containing from about 15 to about 85 gallons of available oil per ton of oil shale and a solid polyolefin selected from the group consisting of polyethylene, polypropylene, polybutylene, copolymers of ethylene and propylene and copolymers of ethylene and butylene, wherein said polyolefin is present in the range of 2 to about 95 weight percent of said admixture, subjecting said admixture to molding conditions of elevated temperature and pressure to make a molded article and subjecting said molded article to a high energy ionizing radiation dosage of about $10^6$ to about $10^9$ roentgen units.

2. The process of claim 1 wherein said radiation comprises an energy level at least equivalent to X-ray.

3. The process of claim 1 wherein said radiation comprises gamma rays.

4. The process of claim 1 wherein said irradiation takes place in the substantial absence of air.

5. The process of claim 1 wherein said polyolefin comprises polyethylene having a density of 0.940 to 0.990 gm./cc.

6. A process for making a molded article having an increased Shore D hardness, which comprises intimately admixing finely divided solid polyolefin selected from the group consisting of polyethylene, polypropylene, polybutylene, copolymers of ethylene and propylene and copolymers of ethylene and butylene and finely divided oil shale containing from about 15 to about 85 gallons of available oil per ton of oil shale, wherein said polyolefin is present in the range of about 2 to about 95 weight percent of said mixture, subjecting said mixture to a temperature in the range of about 250 to 400° F. and a pressure in the range of about 500 to about 20,000 p.s.i. for ½ to about 10 minutes, cooling said molded article to a temperature below the softening point of said polyolefin, removing said molded article from said mold and subjecting said molded article to high energy ionizing radiation for a total dosage of about $10^6$ to $10^9$ roentgen units.

7. The process of claim 6 wherein said polyolefin comprises polyethylene having a density of 0.940 to 0.990 gm./cc.

8. The process of claim 6 wherein said irradiation takes place in the substantial absence of air.

9. The process of claim 6 wherein said ionizing radiation comprises an energy level at least equivalent to X-ray.

10. The process of claim 9 wherein said dosage is applied at a dose accumulation rate in the range of $10^3$ to $10^7$ roentgens per hour.

11. A process for making molding articles having an increased Shore D hardness, which comprises intimately admixing finely divided polyethylene and finely divided oil shale containing from about 15 to about 85 gallons of available oil per ton of oil shale, wherein said polyethylene is present in the range of about 5 to about 95 weight percent of said mixture, subjecting said mixture to a temperature in the range of about 300 to about 350° F. and a pressure in the range of about 500 to about 20,000 p.s.i. for about ½ to about 10 minutes, cooling said article below 260° F., removing said article from said mold and subjecting said article to high energy ionizing radiation comprising gamma rays at a dose accumulation rate of $10^3$ to $10^7$ roentgens per hour for a total dosage of $10^6$ to $10^9$ roentgens.

12. The process of claim 11 wherein said polyethylene has a density of 0.940 to 0.990 gm./cc.

13. The process of claim 12 wherein said article is irradiated in the substantial absence of air and in the presence of helium.

References Cited by the Examiner

UNITED STATES PATENTS

| | | | |
|---|---|---|---|
| 2,805,072 | 9/1957 | Smith | 204—154 |
| 2,900,269 | 8/1959 | Bauman et al. | 106—218 |
| 2,919,473 | 1/1960 | Cole | 204—154 |
| 2,924,559 | 2/1960 | Safford et al. | 204—154 |
| 2,945,795 | 7/1960 | Cummin | 204—154 |
| 3,072,593 | 1/1963 | Marx et al. | 260—33.6 |

FOREIGN PATENTS 105,831  5/1917  Great Britain.

MURRAY TILLMAN, *Primary Examiner.*

JOHN R. SPECK, *Examiner.*

W. L. BASCOMB, *Assistant Examiner.*